P. S. MARTIN.
DEVICE FOR HEATING RADIATORS OF MOTOR VEHICLES.
APPLICATION FILED AUG. 20, 1917.
1,322,036.
Patented Nov. 18, 1919.
3 SHEETS—SHEET 3.
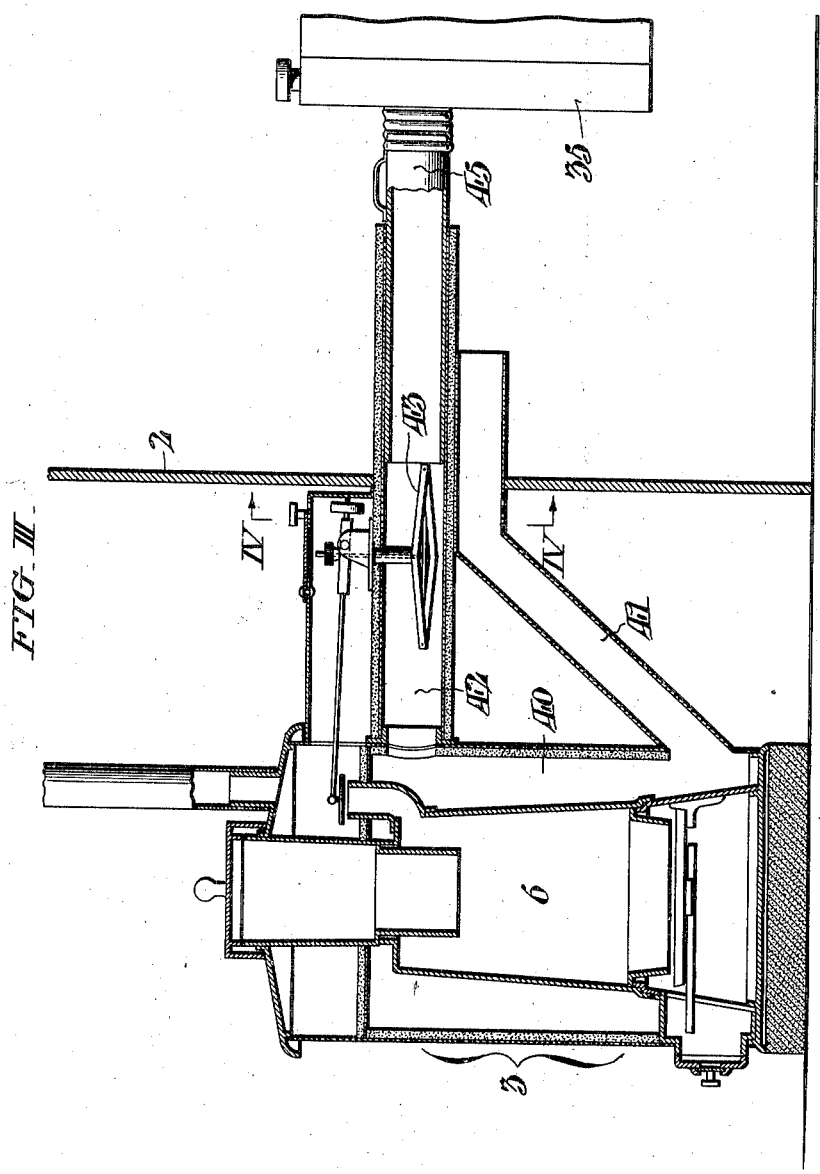
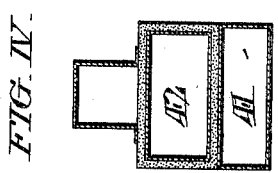
Witnesses
John C. Bergner
James H. Bell
Inventor
Perry S. Martin,
By Macy & Paul,
Attorneys

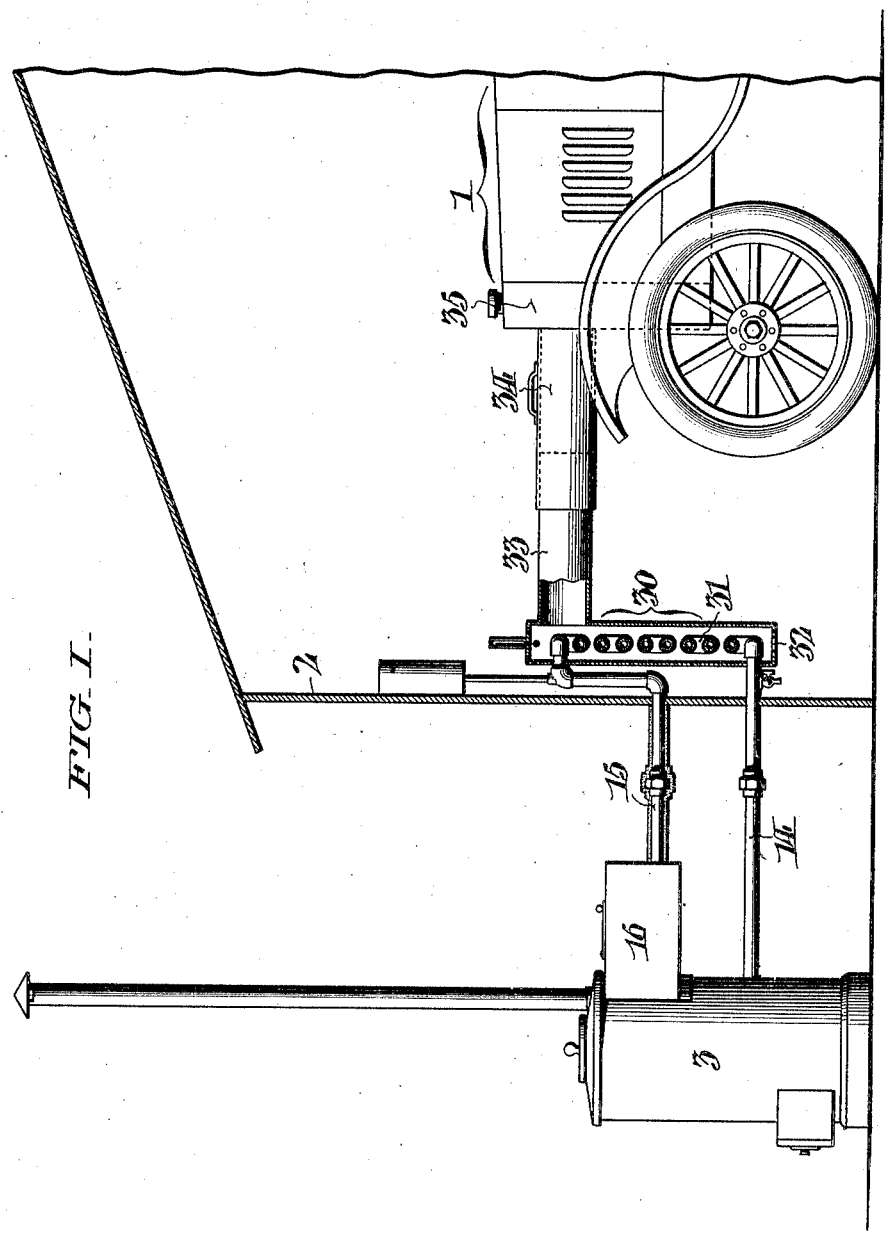

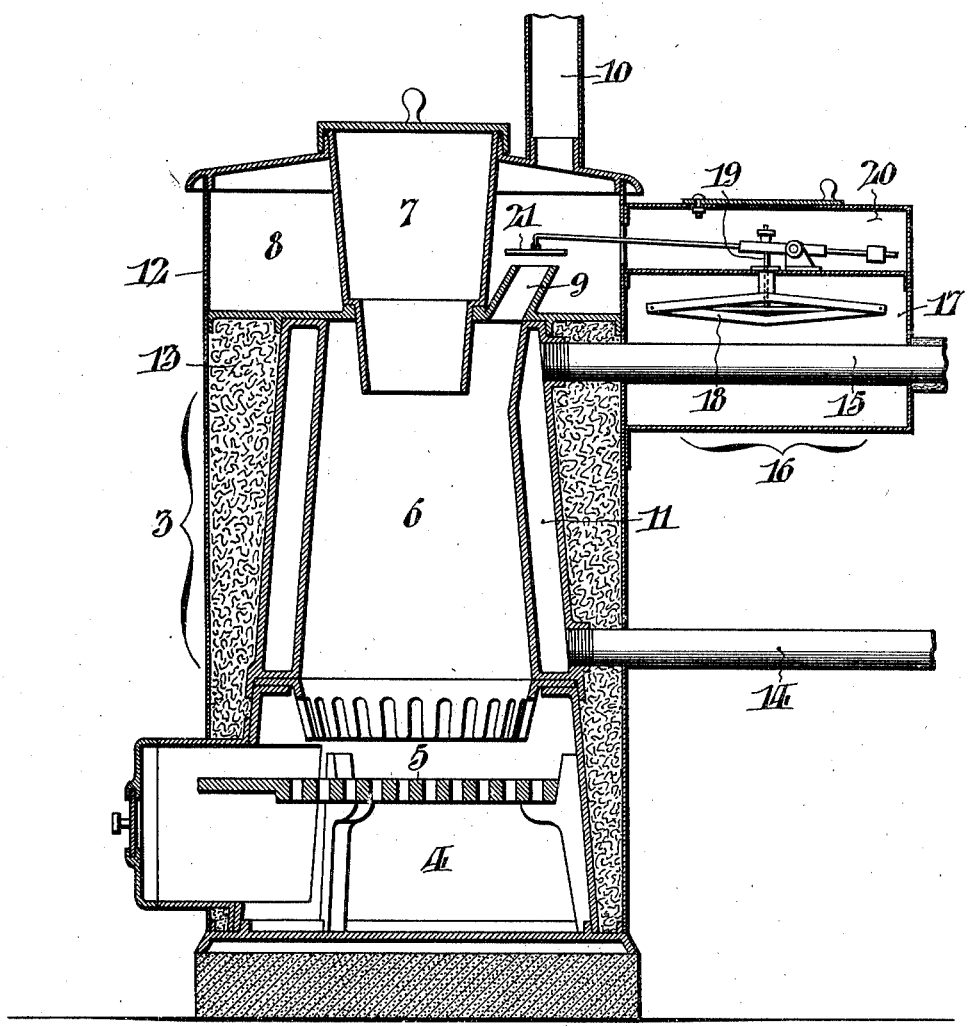

UNITED STATES PATENT OFFICE.

PERRY S. MARTIN, OF HARRISONBURG, VIRGINIA.

DEVICE FOR HEATING RADIATORS OF MOTOR-VEHICLES.

1,322,036.　　　　　Specification of Letters Patent.　　Patented Nov. 18, 1919.

Application filed August 20, 1917. Serial No. 187,070.

*To all whom it may concern:*

Be it known that I, PERRY S. MARTIN, of Harrisonburg, in the county of Rockingham and State of Virginia, have invented certain new and useful Improvements in Devices for Heating Radiators of Motor-Vehicles, whereof the following is a specification, reference being had to the accompanying drawings.

The object of my device is to economically and safely maintain the radiator of a motor vehicle which is not in use, at a temperature to prevent freezing of the water circulatory system of the motor vehicle. To this end I provide a heating device, and also an air circulation system which is heated by said heating device, but which is entirely shut off from the combustion draft thereof. The heated air from this air circulation system is caused to pass or delivered directly into or against the radiator of the motor vehicle, and by constantly maintaining this air circulation at a sufficient temperature, the motor vehicle radiator is prevented from becoming so cold as to permit freezing of the water. In order to accomplish this economically, I employ a thermostat for the control of the heater. The thermostat may act upon the draft or current of air to support combustion and of burning gases and hot products of combustion, since by regulating or throttling this virtually continuous combustion draft at any point, it is, in effect, controlled throughout, and the combustion, temperature, and action of the heater are thereby regulated. The current of air to the vehicle radiator being shut off from and independent of the hot portion of the combustion draft, it will not injure the radiator in any way.

By the use of this device, it is possible in cold weather to leave a motor vehicle for an indefinite length of time in an otherwise unheated building without draining the water from the circulatory system. In order to obtain a maximum of safety, I place the heater exterior to the inclosure which contains the motor vehicle, and pass into said inclosure only a fluid, such as air or water, which has been raised to the proper temperature by the external heater. The heat thus obtained is delivered directly against the front of the radiator of the motor vehicle, and thus accomplishes the purpose of my device without the presence of any flame or any of the heated products of combustion within the inclosure which contains the motor vehicle.

In the accompanying drawings, Figure I, is a sectional elevation showing a heater circulatory system, and part of the motor vehicle, and its inclosure as arranged to carry out my invention.

Fig. II, is a vertical section of the heater and adjacent parts shown in Fig. I.

Fig. III, is a vertical sectional view of a heater circulatory system and part of the motor vehicle and its inclosure, showing a modified form of my invention.

Fig. IV, is a cross sectional view along the line IV, IV, of Fig. III.

Referring to Fig. I, the motor vehicle 1, is contained within an inclosure, of which 2, is a sectional view of one of the walls. Without this wall is a heater 3, the details of which are shown in Fig. II. It comprises a fire box 4, with a grate 5, a combustion chamber 6, a magazine 7, an auxiliary air chamber 8, surmounting the combustion chamber and into which the products of combustion are led by the passage 9, and a chimney flue 10, by which the products of combustion escape. Surrounding the combustion chamber 6, is a water chamber 11, which is in turn surrounded by the heater casing 12, with heat insulating material 13, interposed. To the water jacket 11, leads a water pipe 14, near the bottom, and another water pipe 15, near the top. Alongside of the auxiliary air chamber 8, is a thermostat receptacle 16. The lower part 17, of this thermostat receptacle surrounds the water pipe 15, and contains dead air of corresponding temperature. It contains the thermostat 18, the controlling rod 19, of which passes up to the upper part 20, of the thermostat receptacle wherein are the leverage connections which control the valve 21, by which is regulated the quantity of air passing through the combustion chamber of the heater, and therefore the temperature of the heater.

Referring to Fig. I, it will be observed that within the inclosure which contains the motor vehicle there is an air chamber 30, containing water circulation pipes 31, appropriately connected to the water circulatory pipes 14, and 15, which for this purpose pass through the wall 2, of the inclosure. The air chamber 30, has an opening 32, at the bottom, and near the top opens into an air flue 33, upon the end of which is a telescopic extension 34, which may be adjusted so as to abut immediately against the front of the radiator 35, of the motor vehicle 1.

The operation of this device is as follows: As the heater and its combustion draft are entirely without the motor vehicle inclosure, there is no danger of fire. The water circulation which has been described is accurately maintained at the desired temperature by means of the thermostat. This water circulation passing into the motor vehicle inclosure raises to the desired temperature the air in the air compartment 30, and as this has considerable vertical height an air circulation is induced with air which constantly enters at 32, and after being raised to the proper temperature is delivered and discharged directly in front of and into or against the radiator of the motor vehicle, thus, maintaining therein and thereabout a sufficient temperature to prevent the freezing of the water of the circulation system of the motor vehicle.

In the modified form of my device shown in Fig. III, it will be observed that the water circulatory system is omitted. The heater, the parts of which will be sufficiently understood from the drawing without enumeration, is entirely exterior to the wall 2, of the inclosure. The combustion chamber 6, instead of being surrounded by a water jacket is surrounded by an air jacket 40. A cold air flue 41, leads from within the motor vehicle inclosure to near the bottom of the air jacket 40. A hot air flue 42, leads from near the top of the air jacket back through the wall 2. The latter flue, as well as the walls of the air jacket of the heater, are properly protected against loss of heat by insulating material. Within the hot air flue 42, is the thermostat 43, by which the combustion draft of the heater is controlled. An extension 45, slides telescopically within the hot air flue 42, at the end of it which is within the motor vehicle inclosure, and may be adjusted as shown in the drawing so as to discharge hot air against the front of the radiator 35, of a motor vehicle.

In previous devices in which products of combustion have been discharged directly into a motor vehicle radiator not only has the fire risk been increased, but fouling and rusting of the radiator has ensued. Also, such arrangements are uneconomical because delivering a variable or excessive amount of heat.

Having thus described my invention, I claim:

1. The combination of a motor vehicle inclosure, a heater with its hot combustion draft wholly external to said inclosure, and means for heating from said heater a current of air independent of its said hot combustion draft and delivering the air so heated against the radiator of a motor vehicle within said inclosure.

2. The combination of a motor vehicle inclosure, a heater with its hot combustion draft wholly external to said inclosure, and means, comprising a fluid circulating system wherein the circulating fluid is heated by the heater and passed back and forth through the wall of the inclosure, for heating from said heater a current of air independent of its said hot combustion draft and delivering the air so heated against the radiator of a motor vehicle within said inclosure.

3. The combination of a motor vehicle inclosure, a heater with its hot combustion draft wholly external to said inclosure, and means whereby a current of air wholly independent of said hot combustion draft is caused to be heated by said heater and passed through the wall of said inclosure and delivered therein against the radiator of a motor vehicle.

4. The combination of a motor vehicle inclosure, a heater wholly external thereto, and means for causing a current of air wholly independent of its hot combustion draft to be heated by said heater and for passing the air so heated through the wall of said inclosure and delivering the same therein against the radiator of a motor vehicle, said means comprising an air pipe end adjustable to bring it into abutment against the radiator.

In testimony whereof, I have hereunto signed my name at Harrisonburg, Virginia, this fifteenth day of August, 1917.

PERRY S. MARTIN.

Witnesses:
  G. R. SPITZER,
  E. W. SNYDER.